Jan. 28, 1958 F. H. GEE 2,821,038
COMBINATION SIGN AND ILLUMINATING MEANS FOR TELEPHONE BOOTHS
Filed June 24, 1953 2 Sheets-Sheet 1
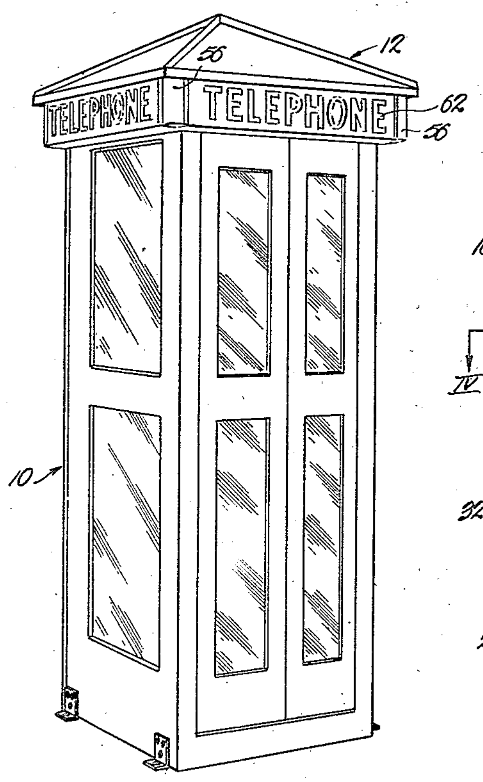
Fig. 1.
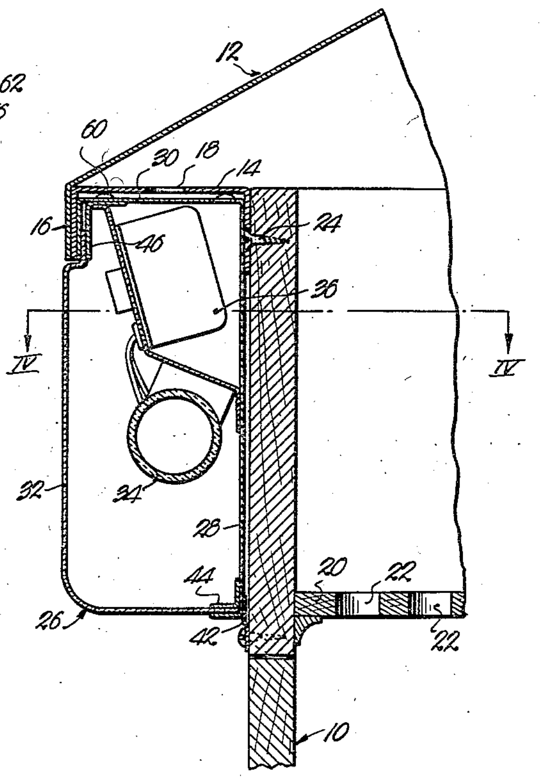
Fig. 3.
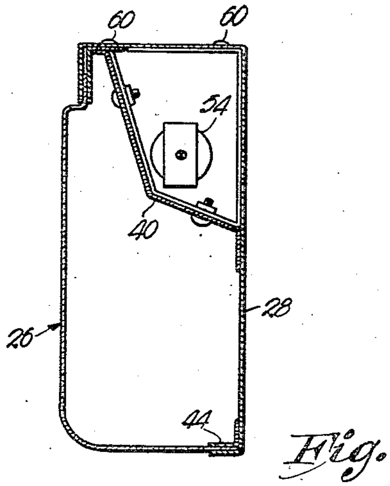
Fig. 5.
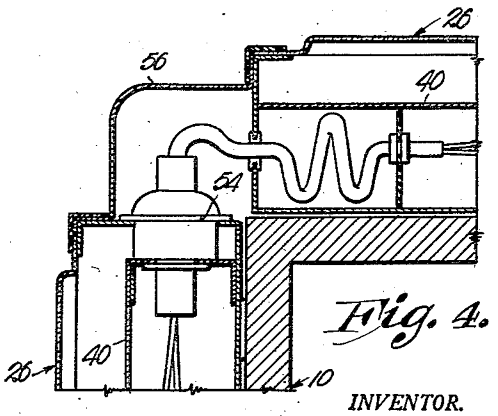
INVENTOR.
Frank H. Gee
BY
[signature]
ATTORNEY.

Jan. 28, 1958 F. H. GEE 2,821,038

COMBINATION SIGN AND ILLUMINATING MEANS FOR TELEPHONE BOOTHS

Filed June 24, 1953 2 Sheets-Sheet 2

INVENTOR.
Frank H. Gee
BY
ATTORNEY.

United States Patent Office 2,821,038

Patented Jan. 28, 1958

2,821,038

COMBINATION SIGN AND ILLUMINATING MEANS FOR TELEPHONE BOOTHS

Frank H. Gee, St. Joseph, Mo., assignor to Geeco, Inc., St. Joseph, Mo., a corporation of Missouri Application June 24, 1953, Serial No. 363,823

1 Claim. (Cl. 40—132)

This invention relates to improvements in structure for illuminating and otherwise attracting attention to telephone booths, the primary object being to provide a plurality of lamp units that may be attached to the booth beneath the eaves of the roof thereof for protection thereby, and each of which is adapted to not only illuminate the booth itself but to illuminate a sign identifying the telephone structure.

It is the most important object of the present invention to provide structure of the aforementioned character that includes a number of elongated lamp units mounted on the side walls of the telephone booth and interconnected electrically so as to require but a single connection with a source of electrical energy.

Another object hereof is to provide electrical illuminating units that may be interconnected electrically and structurally in complete surrounding relationship to the telephone booth so as to not only present an attractive arrangement, but to completely light the booth and to illuminate signs thereon.

Other objects include the way in which each unit is provided with a cover that is pervious to rays of light emanating from lamps housed therewithin; the way in which the covers are formed to direct the rays of light downwardly toward and around the telephone booth and also outwardly through a sign painted or otherwise formed thereon; the manner in which the units are formed to render the roof and particularly the eave thereof adaptable to hold the units in place; and other more minor objects to be hereinafter made clear.

In the drawings:

Figure 1 is a perspective view of a telephone booth having combination sign and illuminating means made pursuant to the present invention operably mounted thereon.

Fig. 3 is a fragmentary, cross-sectional view taken on line III—III of Fig. 2.

Fig. 4 is a fragmentary, cross-sectional view taken on line IV—IV of Fig. 3.

Fig. 5 is a detailed, cross-sectional view taken on line V—V of Fig. 2; and

Figure 2:
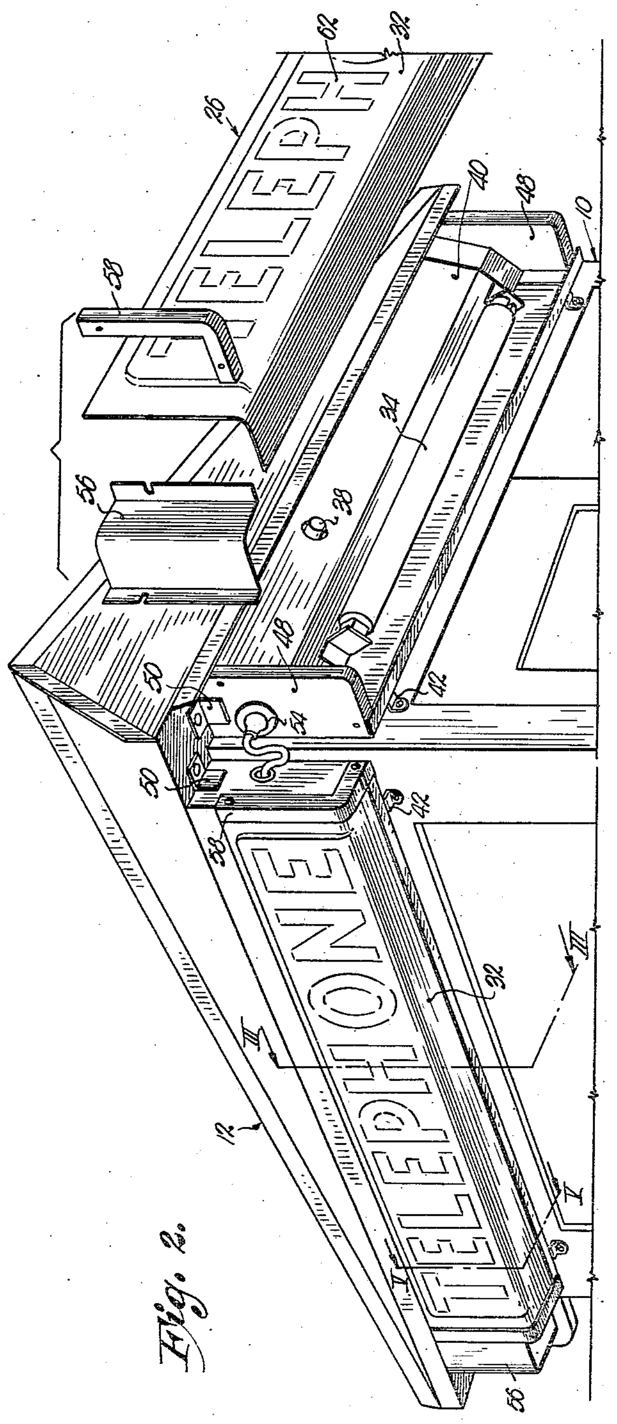
Fig. 2 is an enlarged, fragmentary, perspective view thereof partially exploded.

A telephone booth substantially of conventional character is illustrated in Fig. 1 of the drawings and designated by the numeral 10. Booth 10 is provided with a roof in the usual manner and the roof 12, chosen for illustration, has an eave 14 for each side wall respectively of the booth 10, together with a downturned flange 16 at the outermost edge thereof. Eaves 14 are each substantially U-shaped in cross-section, the bights whereof are provided with a plurality of vent openings 18 for circulation of air in the booth 10, and in this respect it is noted that ceiling 20 has openings 22 therein for such circulation purposes as is quite common. One of the legs of the eave 14 abuts the proximal flange 16 and the other leg thereof is secured directly to the booth 10 by fasteners 24.

One or more of the side walls of the booth 10 is provided with a combination sign and illuminating means broadly designated by the numeral 26. Each unit 26 consists of an elongated, hollow housing having a back wall 28, a top wall 30, and a cover 32 made of transparent or translucent material so as to be pervious to the passage of rays of light emanating from an elongated lamp 34 disposed within the housing.

Figure 6:
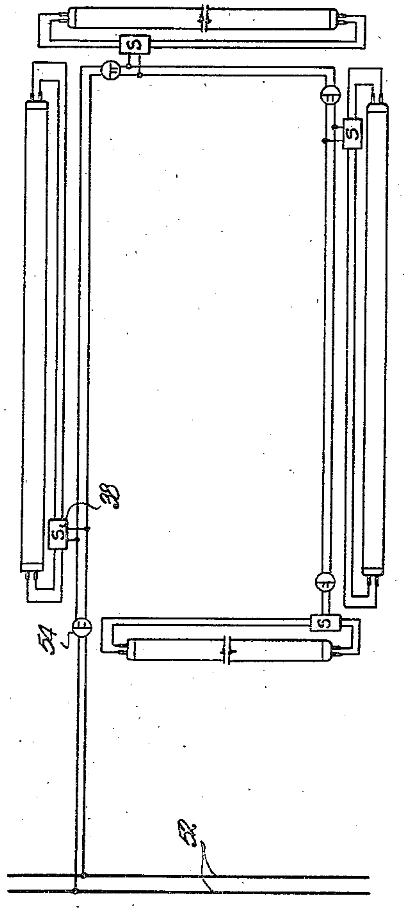
Fig. 6 is a schematic view showing the wiring arrangement of the electrical components of the assembly.

The lamps 34 selected for illustration are of fluorescent or cold nature and, therefore, are provided with ballasts 36 and starters 38 all mounted upon a longitudinally extending bracket 40 secured to the walls 28 and 30. Each unit is fitted within a U-shaped eave 14 and is mounted on the corresponding wall by ears 42 rigid therewith. Channel means 44 and 46 on walls 28 and 30 respectively, receive the cover 32 and the housing thus formed is closed by end caps 48. Additional ears 50 on the ends 48 secure the units 26 to the eaves 14. As shown in Fig. 6 of the drawings, lamps 34 are coupled in parallel with power lines 52 as a continuous blank through the medium of a plurality of plugs 54 located at the ends of the units 26 in the manner also made clear by Figs. 2 and 4 of the drawings. Consequently, a single point of connection with a source of energy is needed to ignite all four lamps 34 if the illuminating means is formed to surround the booth 10 in the manner illustrated by Fig. 6.

The plugs 54 and the wire connections between the units 26 at the ends thereof, and which extend through the caps 48, are protected and hidden from view by corner members 56 that are in turn releasably held in place by L-shaped moldings 58, which also cooperate with channel means 44 and 46 in holding the cover 32 in place as shown in Fig. 4.

Top wall 30 is provided with a plurality of upwardly extending embossments 60 that maintain the units 26 spaced from the bights of these eaves 14 so as to avoid obstruction of free flow of air through openings 18. A sign 62 indicative of the nature of the booth 10 is imprinted, embossed or otherwise formed on the vertical wall of cover 32 and it can thus be seen that when the lamps 34 are energized, these signs 62 will be lighted and the entire booth 10 will be illuminated by virtue of the rays of light from the lamps 34 being directed downwardly through the bottom horizontal leg of covers 32.

By positioning the units 26 in underlying relationship to the eaves 14, and further, by extending the roof 12 downwardly in partial embracing relationship to the units 26 in flange 16, all of the electrical assemblies are adequately protected from the elements and are not likely to be damaged through normal use of the telephone booth 10. The latter can be seen at night from great distances and by virtue of its complete illumination will not become as easily subjected to vandalism as has heretofore been experienced by telephone companies. Such illumination is also beneficial to the users of the booth 10, and while details of construction hereinabove set forth may be varied, it is desired to be limited only by the spirit of the invention as defined by the scope of the appended claim.

Having thus described the invention what is claimed as new and desired to be secured by Letters Patent is:

In an illuminating sign for out door booths having horizontal, U-shaped eaves extending outwardly from the sides of the booth beneath the roof thereof, an elongated L-shaped plate having a vertical back wall and a horizontal top wall, each of the walls being provided with relatively narrow, longitudinally extending channel members at the outermost ends thereof, each of the channel members extending laterally and inwardly from its respective wall, the member on said top wall lying in a substantially vertical plane and the member on said back wall lying in a substantially horizontal plane; means for attaching the plate to a booth within said U-shaped eaves with said back wall bearing against the vertical wall of the booth and the top wall bearing against the eave; an elongated, L-shaped, translucent panel substantially co-extensive in a length with said plate and having a vertical leg and a substantially shorter horizontal leg, the marginal edges of said legs being removably disposed in corresponding channel members, the panel and the plate presenting a tubular case substantially rectangular in cross section when the edges are disposed in their respective channel members; substantially rectangular closure caps removably attached to each end of the eave; indicia on the vertical leg of said panel for identifying the booth; an elongated lamp mounted in said case and extending substantially the longitudinal length thereof; and a power line electrically connected to said lamp for energizing the same to thereby illuminate said indicia bearing vertical leg and provide illumination downwardly through said horizontal leg along the sides of the booth.

References Cited in the file of this patent

UNITED STATES PATENTS

| | | |
|---|---|---|
| 1,161,387 | Huckel | Nov. 23, 1915 |
| 1,485,472 | Van Bloem | Mar. 4, 1924 |
| 1,926,776 | Faber | Oct. 10, 1933 |
| 2,163,614 | Mansell | June 27, 1939 |
| 2,225,057 | Kuntz | Dec. 17, 1940 |
| 2,233,280 | Barnes | Feb. 25, 1941 |
| 2,336,016 | Jayne et al. | Dec. 7, 1943 |
| 2,346,779 | Muehling | Apr. 18, 1944 |
| 2,607,144 | Harris | Aug. 19, 1952 |
| 2,699,620 | Smythe | Jan. 18, 1955 |